United States Patent [19]
Hogan

[11] Patent Number: 5,628,822
[45] Date of Patent: *May 13, 1997

[54] GRADED FIBER DESIGN AND CONCRETE REINFORCED THEREWITH

[75] Inventor: Dennis J. Hogan, Austin, Tex.

[73] Assignee: Synthetic Industries, Inc., Chickamauga, Ga.

[*] Notice: The term of this patent shall not extend beyond the expiration date of Pat. No. 5,456,752.

[21] Appl. No.: 540,181

[22] Filed: Oct. 6, 1995

Related U.S. Application Data

[63] Continuation-in-part of Ser. No. 136,395, Oct. 13, 1993, Pat. No. 5,456,752, which is a continuation-in-part of Ser. No. 679,752, Apr. 3, 1991, abandoned.

[51] Int. Cl.$^6$ ........................................... C04B 16/06
[52] U.S. Cl. .................... 106/802; 106/644; 106/724
[58] Field of Search ................................ 106/802, 644, 106/724, 711, 727, 731

[56] References Cited

U.S. PATENT DOCUMENTS

| | | | |
|---|---|---|---|
| 2,793,130 | 5/1957 | Shannon et al. | 106/99 |
| 3,044,547 | 7/1962 | Jarboe, Jr. | 166/12 |
| 3,056,686 | 10/1962 | Shannon | 106/85 |
| 3,214,393 | 10/1965 | Sefton | 260/2.5 |
| 3,272,765 | 9/1966 | Sefton | 260/2.5 |
| 3,645,961 | 2/1972 | Goldfein | 260/37 N |
| 3,933,515 | 1/1976 | Yang | 106/99 |
| 4,306,911 | 12/1981 | Gordon et al. | 106/99 |
| 4,339,273 | 7/1982 | Meier et al. | 106/90 |
| 4,414,030 | 11/1983 | Restrepo | 106/90 |
| 4,565,840 | 1/1986 | Kobayashi et al. | 524/8 |
| 4,960,465 | 10/1990 | Arfaei | 106/724 |
| 4,968,561 | 11/1990 | Mizobe et al. | 428/397 |
| 5,456,752 | 10/1995 | Hogan | 106/802 |

FOREIGN PATENT DOCUMENTS 1406442  4/1972  United Kingdom.

OTHER PUBLICATIONS

"Properties of Graded Fibrillated Polypropylene Fiber Reinforced Concrete" by Bayasi, Department of Civil Engineering, San Diego State University, Sep. 1992.

"Post-Peak Flexural Strength of Synthetic Fiber Reinforced Concrete Using MD Polypropylene Fibers Manufactured by Fibermesh Company" By Bayasi, Department of Civil Engineering, San Diego State University, Feb. 1993.

"Post-Peak Flexural Strength of Synthetic Fiber Reinforced Concrete Using ¾" Monofilament Polypropylene Fibers Manufactured by Fibermesh Company" by Bayashi, Dept. of Civil Engineering, San Diego State Univ., Apr. 1993.

"Post-Peak Flexural Strength of Synthetic Fiber Reinforced Concrete Using ½" Monofilament Polypropylene Fibers Manufactured by Fibermesh Company" by Bayashi, Dept. of Civil Engineering, San Diego State Univ., May 1993.

*Primary Examiner*—Paul Marcantoni
*Attorney, Agent, or Firm*—Renner, Kenner, Greive, Bobak, Taylor & Weber

[57] ABSTRACT

Graded fiber additives for addition to proportioned concrete comprising a mixture of fibers having deniers ranging from about 3 to about 5000 and lengths ranging from about 0.0625 to 3 inches (0.16 to 7.6 cm), graded to provide pluralities of different fiber designs comprising variations in at least three of lengths, widths, thicknesses, deniers, fibrillations, cross-sections or aspect ratios, prior to their addition to concrete, or at least two of lengths, widths, thicknesses, deniers, fibrillations or aspect ratios, prior to their addition to concrete, or at least two of widths, thicknesses, deniers, fibrillations, cross-sections or aspect ratios, prior to their addition to the concrete, so as to accommodate the mortar factions within proportioned concrete containing graded aggregate, provide a continuous distribution of fibers therein and thereby inhibit the initiation of cracking. The present invention also provides concrete having improved crack resistance consisting essentially of concrete; and from about 0.025 to 1 percent by volume of a graded, synthetic fiber mixture, having deniers ranging from about 3 to about 5000 and lengths ranging from about 0.0625 to 3 inches (0.16 to 7.6 cm), as described hereinabove, whereby initiation of cracking of the concrete is inhibited as compared to concrete reinforced by the addition of single length fibers. The present invention further provides methods for improving the crack resistance of concrete and for inhibiting the initiation of cracking thereof.

37 Claims, 5 Drawing Sheets

GRADED FIBER DESIGN AND CONCRETE REINFORCED THEREWITH

CROSS-REFERENCE TO RELATED APPLICATIONS

This application is a continuation-in-part of U.S. Ser. No. 08/136,395, filed Oct. 13, 1993, now U.S. Pat. No. 5,456,752, which is a continuation-in-part of U.S. Ser. No. 07/679,752, filed Apr. 3, 1991, now abandoned.

TECHNICAL FIELD

The present invention relates to the reinforcement of concrete and like products via the use of graded, synthetic fibers. Synthetic fibers have an established record in the reinforcement of concrete as an alternative to wire mesh and are successful in inhibiting shrinkage cracking, increasing impact capacity, reducing permeability, adding shatter resistance and reducing construction time. In particular, novel graded fiber designs are provided by the present invention, as are improved concrete mixtures reinforced thereby.

BACKGROUND ART

U.S. Pat. No. 4,565,840 provides fiber reinforced concrete comprising from one to six percent by volume of a mixture of short steel fibers.

The addition of fibrillated plastic filaments to cement mortar is disclosed in U.S. Pat. No. 4,414,030. Such fibrillated filaments comprise ribbons having a length of up to 50 millimeters long and are said to be split apart during mixing with the mortar components to provide a random distribution of separate reinforcing plastic filaments throughout the mortar.

The use of discrete fibers in the reinforcement of concrete is set forth in U.S. Pat. No. 3,645,961. The patent discloses the use of nylon, polyvinyl chloride and simple polyolefins in lengths ranging between one-quarter to three inches (0.6 to 7.5 cm) to form a blast resistant concrete.

U.S. Pat. No. 4,306,911 teaches that water sensitive and water-insensitive fibers can be treated with materials that coat both types with a water-insoluble material. The resulting combination of filter fibers and reinforcing fibers can be used to produce asbestos-free fiber-reinforced cement products with similar product and performance properties.

U.K. Pat. No. 1,406,442 discloses that reinforced concrete articles which contain fiber strands of at least two fibers twisted together have better tensile strength, crack control, impact resistance, toughness and energy absorption when subjected to destructive (e.g., explosive) loads. The results cannot be achieved merely by adding the strands to conventional concrete mixes, but require adjustments in coarse and fine aggregate volumes, and the inclusion of significant proportions, such as ten percent, of fines, such as pulverized fuel ash. A mixing aid, such a polyethylene oxide, is also recommended to enable increased amounts of fibers to be incorporated. Improvements in strengths depend upon a judicious combination of different degrees of length, cross-sectional dimensions and proportions of mixed fibers, leading to multiple cracking.

The use of fibrous materials made from nylon, polypropylene, polyvinylidene chloride and polyethylene is set forth in U.S. Pat. No. 3,645,961. Less than 3 percent of these fibers in lengths from ¼ to 3 inches (0.6 to 7.5 cm) can be mixed into concrete to make blast-resistant structures.

The use of fibrillated polypropylene fibers from 0.05 to 2 percent by weight of the total wet mixture of water-hardenable inorganic materials is presented in U.S. Pat. No. 3,591,395.

Different fibers and polymer materials have been added to concrete and cement for a variety of purposes. U.S. Pat. No. 3,056,686 for instance, is directed toward a mass of glass reinforcement and a binder comprising an inorganic silicate. The invention resides in the binder, which is alkaline, but is reacted with an ion exchange material to prevent it from attacking the fiber glass reinforcement.

U.S. Pat. No. 2,793,130 provides a method for protecting glass fiber reinforcement in cement, which involves coating the glass fibers prior to contact with the cement. The coating comprises a water-soluble salt of a polyvalent metal, applied to the fibers, which is then treated with a material that can release hydroxy ions. The latter react in situ on the glass to form a water-insoluble reaction products with the soluble salt.

These patent references represent the significant prior art on the use of fibers in concrete over the last forty years. This body of art addresses the use of fibers, alone or in combination with other materials, that perform primary reinforcing functions. The present invention addresses the issue of secondary reinforcement, as it applies to the prevention and inhibition of shrinkage cracking and the behavior of the fibers covered by the invention after cracking under flexural stress.

Despite the fact that fibers and other materials have found great utility as additions to cement, concrete, precast products, mortar, stucco and the like, as secondary reinforcements, it has not been known heretofore to employ a plurality of fiber designs designed to an optimum gradation in one mixture for incorporation into concrete and like materials.

DISCLOSURE OF THE INVENTION

It is therefore an object of the present invention to provide a mixture of graded, synthetic fibers for reinforcing concrete and like materials.

It is a further object of the present invention to provide a mixture of graded, synthetic fibers having a plurality of different deniers, cross-sections and aspect ratios within the same mixture.

It is another object of the present invention to provide concrete and like materials having improved crack resistance, impact capacity, and shatter resistance.

It is still another object of the present invention to employ mixtures of various types of fibers within a blend for addition to concrete and like materials.

It is yet another object of the present invention to provide an improved method for reinforcing concrete and like materials.

It is a still further object of the present invention to provide a mixture of graded, synthetic fibers, specifically selected to accommodate the proportions and sizes of the aggregate contained in the concrete, in order to inhibit the initiation of cracking.

At least one or more of the foregoing objects, together with the advantages thereof over the known fiber additives for concrete mixtures, which shall become apparent from the specification which follows, are accomplished by the invention as hereinafter described and claimed.

In general, the present invention provides graded fiber additives for addition to proportioned concrete comprising a mixture of fibers having deniers ranging from about 3 to about 5000 and lengths ranging from about 0.0625 to 3 inches (0.16 to 7.6 cm), graded to provide pluralities of different fiber designs comprising variations in at least three of lengths, widths, thicknesses, deniers, fibrillations, cross-sections or aspect ratios, prior to their addition to concrete, or at least two of lengths, widths, thicknesses, deniers, fibrillations or aspect ratios, prior to their addition to concrete, or at least two of widths, thicknesses, deniers, fibrillations, cross-sections or aspect ratios, prior to their addition to the concrete, so as to accommodate the mortar factions within proportioned concrete containing graded aggregate, provide a continuous distribution of fibers therein and thereby inhibit the initiation of cracking.

The present invention also provides concrete having improved crack resistance consisting essentially of concrete; and from about 0.025 to 1 percent by volume of a graded, synthetic fiber mixture, having deniers ranging from about 3 to about 5000 and lengths ranging from about 0.0625 to 3 inches (0.16 to 7.6 cm), graded to provide pluralities of different fiber designs comprising variations in at least three of lengths, widths, thicknesses, deniers, fibrillations, cross-sections or aspect ratios, prior to their addition to concrete, or at least two of lengths, widths, thicknesses, deniers, fibrillations or aspect ratios, prior to their addition to concrete, or at least two of widths, thicknesses, deniers, fibrillations, cross-sections or aspect ratios, prior to their addition to the concrete, so as to accommodate the mortar factions within proportioned concrete containing graded aggregate and provide a continuous distribution of fibers therein; whereby initiation of cracking of the concrete is inhibited as compared to concrete reinforced by the addition of single length fibers.

The present invention further provides a method for improving the crack resistance of concrete comprising the steps of adding to a selected amount of concrete, from about 0.025 to 1 percent by volume of a synthetic fiber mixture, having deniers ranging from about 3 to about 5000 and lengths ranging from about 0.0625 to 3 inches (0.16 to 7.6 cm), graded to provide a plurality of different fiber designs comprising variations in at least three of lengths, widths, thicknesses, deniers, fibrillations, cross-sections or aspect ratios, prior to their addition to concrete, or at least two of lengths, widths, thicknesses, deniers, fibrillations or aspect ratios, prior to their addition to concrete, or at least two of widths, thicknesses, deniers, fibrillations, cross-sections or aspect ratios, prior to their addition to the concrete, so as to accommodate the mortar factions within the concrete and provide a continuous distribution of fibers therein; and mixing the components sufficiently to distribute the fibers uniformly throughout the concrete, whereby initiation of cracking of the concrete is inhibited as compared to concrete reinforced by the addition of single length fibers.

The present invention also provides a method for inhibiting the initiation of cracking in concrete during curing stages comprising the steps of adding to a selected amount of concrete, from about 0.025 to 1 percent by volume of a synthetic fiber mixture, having deniers ranging from about 3 to about 5000 and lengths ranging from about 0.0625 to 3 inches (0.16 to 7.6 cm), graded to provide a plurality of different fiber designs comprising variations in at least three of lengths, widths, thicknesses, deniers, fibrillations, cross-sections or aspect ratios, prior to their addition to concrete, or at least two of lengths, widths, thicknesses, deniers, fibrillations or aspect ratios, prior to their addition to concrete, or at least two of widths, thicknesses, deniers, fibrillations, cross-sections or aspect ratios, prior to their addition to the concrete, so as to accommodate the mortar factions within the concrete and provide a continuous distribution of fibers therein; and mixing the components sufficiently to distribute the fibers uniformly throughout the concrete, whereby initiation of cracking of the concrete is inhibited as compared to concrete reinforced by the addition of single length fibers.

The present invention further provides fiber additives for addition to proportioned concrete comprising a synthetic fiber mixture containing, prior to its addition to the concrete, at least a first, second, and third plurality of fibers, each of the first, second and third plurality of fibers having deniers ranging from about 15 to about 5000 and lengths ranging from about 0.0625 to 3 inches (0.16 to 7.6 cm), graded so as to accommodate the mortar factions within proportioned concrete containing graded aggregate, provide a continuous distribution of fibers therein and thereby inhibit the initiation of cracking.

The present invention further provides concrete having improved crack resistance consisting essentially of concrete; and from about 0.025 to 1 percent by volume of a synthetic fiber mixture containing, prior to its addition to the concrete, at least a first, second, and third plurality of fibers, each of the first, second and third plurality of fibers having deniers ranging from about 15 to about 5000 and lengths ranging from about 0.0625 to 3 inches (0.16 to 7.6 cm); whereby initiation of cracking of the concrete is inhibited and flexural properties of the concrete are improved as compared to concrete reinforced by the addition of single length fibers.

The present invention further provides a method for improving the crack resistance of concrete comprising the steps of adding to a selected amount of concrete, a mixture of at least a first, second and third plurality of fibers, each of the first, second and third plurality of fibers having deniers ranging from about 15 to about 5000 and lengths ranging from about 0.0625 to 3 inches (0.16 to 7.6 cm); and mixing the components sufficiently to distribute the fibers uniformly throughout the concrete, the fibers being made of synthetic material, whereby initiation of cracking of the concrete is inhibited and flexural properties of the concrete are improved as compared to concrete reinforced by the addition of single length fibers.

The present invention further provides a method for inhibiting the initiation of cracking in concrete during curing stages comprising the steps of adding to a selected amount of concrete, a mixture of at least a first, second and third plurality of synthetic fibers, each of the first, second, and third plurality of fibers having deniers ranging from about 15 to 5000 and lengths ranging from about 0.0625 to 3 inches (0.16 to 7.6 cm); and mixing the components sufficiently to distribute the fibers uniformly throughout the concrete, the fibers being made of synthetic material.

According to the present invention, it has been found that a mixture of fibers, graded in optimum fashion to provide a plurality of different lengths, widths, thicknesses, deniers, fibrillations, cross-sections and/or aspect ratios, will significantly reduce the tendency of concrete containing fibers of this type to shrink or to crack during drying shrinkage. The fibers are more uniformly distributed through the cement portion of a concrete blend, resulting in superior resistance to settling and separation of concrete during placing and drying. The more uniform blends yield better average finished product properties, such as impact strength and flexural strength than equal formula mixes that do not contain graded fibers designed to accommodate the mortar factions in proportioned concrete. This uniformity is further demonstrated by superior retention of flexural properties after flexural stresses have caused the concrete to crack. This phenomenon occurs in cement, concrete, precast products, mortar, stucco and the like, and is markedly superior to equal amounts of non-graded fibers in the same blends. It is this novel and unexpected superiority that is the major object of the present invention.

PREFERRED EMBODIMENT FOR CARRYING OUT THE INVENTION

Figure 1:
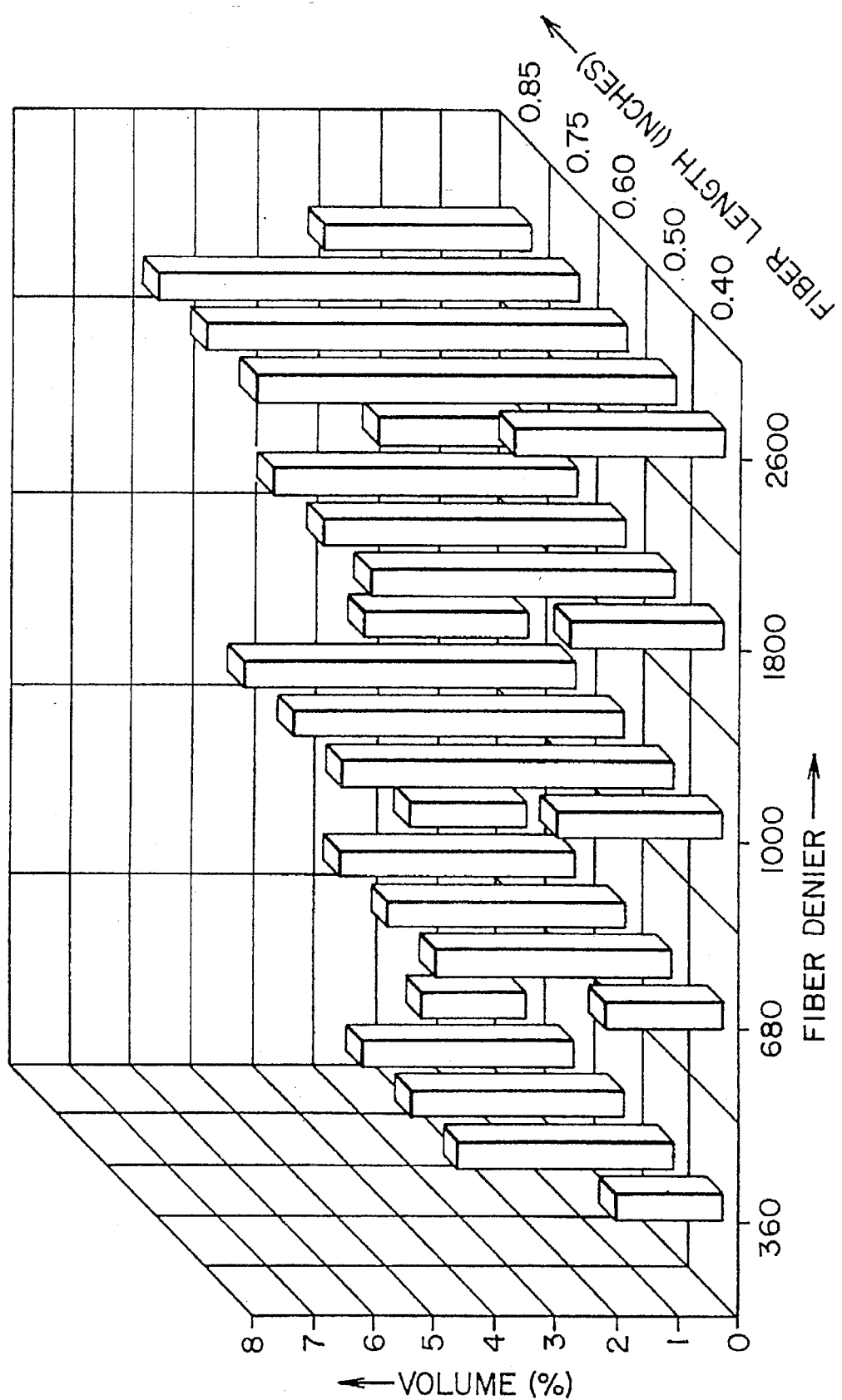
FIG. 1 is a graph schematically depicting 25 fiber designs that form a mixture of graded fibers according to the present invention.

This invention is based on the recognition that concrete is a compound which exhibits in cross-section, coarse aggregate surrounded by various mortar factions. These mortar factions are composed of cement paste and fine aggregate. It is the cement paste that undergoes shrinkage during the hydration process. This volume change results in the formation of shrinkage cracks. In order to provide reinforcement against the propagation of cracks in all paste areas, all of the various dimensional fields that are vulnerable through a mortar void analysis of coarse aggregate are considered. A mixture of graded fibers according to the present invention is then designed to accommodate the various potential paste areas. This mixture will achieve uniform distribution during the normal concrete mixing sequence.

The resultant graded fiber reinforced concrete has a built in immunity against the development of plastic shrinkage cracks. The optimum fiber reinforcement mixture provides the adequate number and spacing of fibers to mechanically inhibit crack formation. Furthermore, the graded fiber mixture offers greater integrity in the hardened concrete. Residual strength is only appreciated and can be measured after some external force causes concrete to crack. These cracks will randomly interrupt the continuity of the paste areas. The present invention recognizes that when all areas prone to cracking are reinforced, the post crack residual strength will be optimized. Microcracks are restricted from gaining energy and enlarging into macrocracks by the presence of graded fiber reinforcement. As a result, the hardened concrete characteristics are improved with greater impact, abrasion and shatter resistance and lower permeability.

The present invention then relates to a novel mixture of synthetic reinforcing fibers which can be utilized for the reinforcement of concrete and like materials and is readily miscible therewith. More particularly, the mixture of synthetic fibers is designed to provide rapid, thorough distribution of the fibers, even under less than ideal conditions or with less than perfect mixes, resulting in improved finishing and reduced plastic cracking. The present invention provides a specific gradation of fiber design which can be blended more rapidly and thoroughly into all types of concrete mixtures including but not limited to, precast products, mortar, grout, shotcrete, cast-in-place concrete, stucco and the like, all of which generally comprise hardenable cement-like materials. The terms concrete, concrete materials or concrete mixtures shall be employed herein with the understanding that all types of concrete products are included such as those listed hereinabove.

Useful fibers for practice of the present invention comprise synthetic materials including polyolefins, such as polyethylene and polypropylene; polyesters; polyvinyl chloride; polyvinylidene chloride; polyamides including aromatic polyamides, such as KEVLAR®; polyacrylics, and mixtures thereof. Practical considerations include creep resistance, a strong trait of polyesters, and dispersibility of the fiber in the concrete mixture, although the absence of either one of these properties should not eliminate a particular polymer. Typically, thermoplastic fibers having specific gravities ranging from about 0.80 to 1.96 are suitable. Practice with one or more types of synthetic fiber in the mixture is within the scope of the invention.

The term fibers as employed herein shall be understood to include monofilament and multifilament materials i.e., filamentary materials, as well as slit films and sheets of synthetic materials which may also be fibrillated i.e., fibrillated materials. Filamentary materials are not limited to cylindrical or round configurations but include all known cross-sectional profiles e.g., rectangular, square, round, oval, hollow, triangular, and the like. Additionally, tri-lobal, multi-lobal, fibrillated, collated, bonded fibrils, entangled monofilaments or monofilaments and roll embossed film fibers are other practical types for concrete reinforcement. Hence, it is customary to refer to the denier of the material i.e., the weight in grams of a 9000 yard length, rather than diameter. As is also known, the filamentary materials can be straight, crimped, slubbed, spiraled, gear crimped, saw-tooth configured, gnarled, cork-screwed or otherwise deformed and all of these configurations are included, and the invention is not limited to a specific shape or configuration of fiber.

The present invention provides mixtures of graded fibers, as will be described in greater detail hereinbelow. It is to be understood that such mixtures encompass mixtures of one type of fiber, e.g., polypropylene, which is preferred, in different sizes; as well as mixtures of different types of fibers e.g., polyolefins and polyamides; and mixtures of different fiber configurations as well as mixtures of different forms, e.g., filamentary materials and fibrillated materials. In each instance, the mixture should be graded in a manner to accommodate the mortar factions of the particular concrete. While all of the parameters, including different lengths, width, thicknesses, deniers, fibrillations by degree or pattern, cross-sections and/or aspect ratios, need not be varied for each fiber design of the graded mixture, it is to be understood that at least one or more parameters will vary between any two fiber designs of the mixture.

The fiber mixture is referred to herein as graded which means that a plurality of different lengths, widths, thicknesses, deniers, fibrillations, cross-sections and/or aspect ratios are manufactured and combined together to form the various fiber designs comprising the mixture. In this manner, maximum density is obtained ensuring that some fibers will become incorporated into virtually every area of the mortar factions, or concrete paste, during mixing, and likewise in the cured product. In one preferred embodiment, the synthetic fibers are graded to provide a plurality of different fiber designs comprising variations in at least three of lengths, widths, thicknesses, deniers, fibrillations, cross-sections or aspect ratios, prior to their addition to concrete, or at least two of lengths, widths, thicknesses, deniers, fibrillations or aspect ratios, prior to their addition to the concrete or, at least two of widths, thicknesses, deniers, fibrillations cross-sections or aspect ratios, prior to their addition to the concrete.

Beginning with the denier, useful deniers range from about 3 to 5000 although broader ranges are not to be precluded. Denier ranges for fibrillated materials are from about 200 to about 30,000, with a range of about 230 to about 5000, being preferred. Similarly, denier ranges for filamentary materials are from about 0.9 to about 3500, with a range of about 3 to about 20, being preferred. The preferred lengths of the fibers range between about 0.4 to 0.85 inches (1 to 2.1 cm) although shorter and longer fibers, approximately 0.0625 and 3 inches (0.16 and 7.6 cm), respectively can be employed. In another embodiment, at least three pluralities of fibers are provided having deniers ranging from about 15 to about 5000 and lengths ranging from about 0.0625 to 3 inches (0.16 to 7.6 cm).

Slit films and sheets will generally have thicknesses of from about 0.0001 to 0.01 inches (0.025 to 2.54 mm) and widths of from about 0.052 to 0.298 inches (1.32 to 7.57 mm) with 0.123 inches (3.12 mm) being preferred. Selection of the fiber designs for a mixture is related to the application. Generally speaking, mixtures of the shorter fibers are preferred for stucco and the like while the longer fibers are preferred for concrete.

With reference to the drawing figures, FIG. 1 is a three-dimensional representation of the distribution of fiber deniers, cut lengths, and volume percentages for five preferred fiber sizes. Each of the five sizes, expressed in denier (its weight in grams for 9000 meters) is cut to five different lengths, from 0.40 to 0.85 inches. Thus there are 25 combinations of volume percent by denier and cut length. One can determine by FIG. 1, for example, that 2600 denier fiber, cut 0.50, 0.60 and 0.75 inches in length, each make up about 6 percent by volume of the total 100 percent.

It is preferred that the shortest and longest fiber lengths comprise a smaller percentage of the total, while the intermediate lengths make up the majority. Minimally, at least three different fiber designs should be mixed together for practice of the present invention. In this instance, selections should be made from each portion of the range as well as one from the middle e.g., fiber lengths of 0.4, 0.6 and 0.85 inches or the like. At the minimum range, the three different fiber designs selected are combined to provide 100 percent by volume of the graded fiber mixture. Preferably, more than three designs are combined, those selected being present in amounts of at least about 2 to 8 percent by volume of the graded fiber mixture.

In FIG. 1, if the individual data points were presented as a cumulative distribution, the volume of each fiber length would describe one half of a bell-shaped curve. Similarly, a cumulative distribution of each fiber denier would describe one half a bell-shaped curve.

Figure 2:
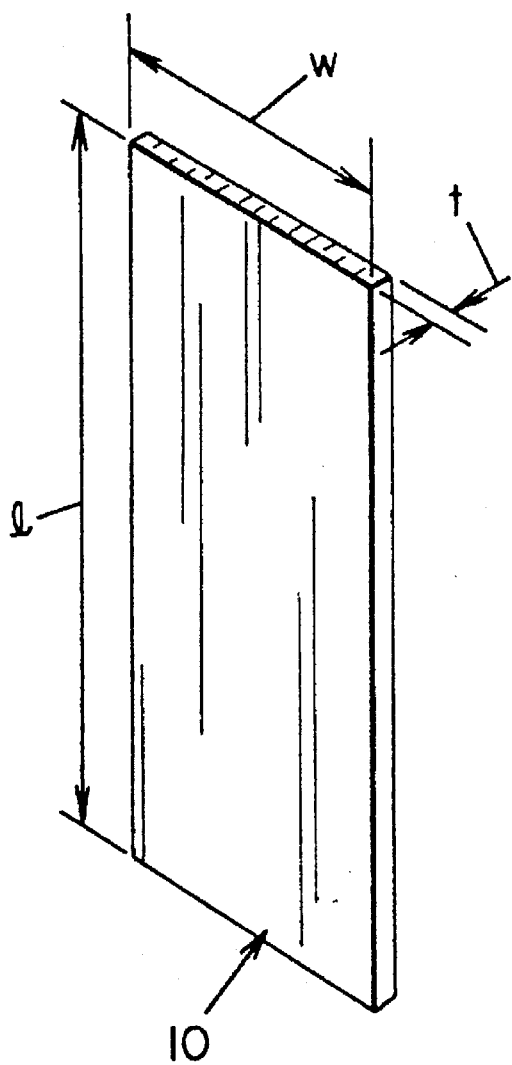
FIG. 2 is an enlarged view of a typical fiber component of the mixture according to the present invention.
Figure 3:
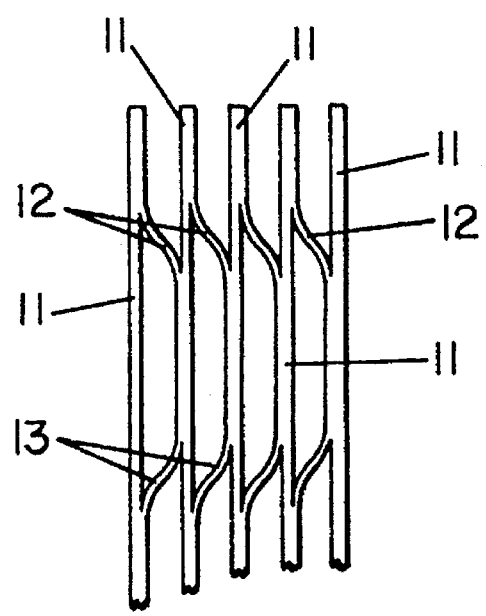
FIG. 3 is further enlarged view of a typical fiber component of the present invention, depicting fibrillation.

FIG. 2 represents an individual fiber strand 10 defined by its length (1), width (w), and thickness (t). By the process of fibrillation, the strand 10 is cut into smaller fibrils 11. FIG. 3 indicates that the fibrils consist of main members 11 and a multitude of connecting side members 12. The size of the various numbered components is defined not only by their length, width, and thickness, but also by their weight, expressed in denier. While the denier of fibrillated materials can be as low as about 15, the denier of the filamentary materials can be significantly less than 15, such as about 3, which is the minimum denier for monofilaments. Additionally, the fibrillated materials are described by the relation of length to width, which is their aspect ratio. The preferred aspect ratios for practice of the present invention vary broadly from about 1:1 to 30:1.

As is known in the synthetic fiber industry, fibrillation is produced by forming large sheets of synthetic material which are first slit into ribbons and then distressed further to produce the fibrillation depicted in FIG. 3. Inasmuch as fibrillation per se, and the methods of producing it are known and do not constitute a novel aspect of the present invention, further detail shall not be provided.

The abrasive action of mixing these fibers into a concrete blend effectively separates most strands into the main fibrils or stems and the side members or webs, depicted in FIG. 3. This added separation into smaller fractions enhances the effectiveness of the gradation process and materially enhances the claimed effects of the invention in the inhibition of crack initiation.

Addition of the fiber mixtures of the present invention to concrete mixtures and similar materials is conventional and merely requires that a quantity be incorporated during mixing and prior to pour or use. Generally, it is desirable to add graded fiber mixtures of the present invention at the rate of about 0.025 to about one percent by volume which, depending upon density of the fiber material, represents about 0.375 pounds to 15 pounds (0.17 to 6.8 Kg) for polypropylene, per cubic yard of concrete, with 0.1 percent by volume, or 1.5 pounds (0.68 Kg) per cubic yard being preferred. Similarly, the method of the present invention for improving the crack resistance of concrete and concrete materials includes the steps of adding a mixture of graded fiber designs, as described herein, to the concrete, and then mixing the components together sufficiently to disperse the fibers thoroughly within the concrete material.

In order to demonstrate the effectiveness of graded fiber mixtures in concrete as a secondary reinforcement, according to the present invention, tests were conducted involving the addition of graded, fibrillated polypropylene fibers, in varying amounts to concrete, followed by measurement of flexural strength. For comparison, fibrillated and monofilament polypropylene fibers and nylon monofilament of constant length, ½ inch (1.25 cm) and ¾ inch (1.9 cm) were also employed in separate specimens.

Samples were prepared and tested according to good concrete practices using ASTM and AASHTO standards and procedures.

Tests were conducted to compare concrete containing graded synthetic fibers with concrete containing single length fibers. Several performance parameters were compared at several fiber volume levels such as post crack integrity, impact resistance, permeability and shrinkage. The single length fibers tested included ½ inch (1.25 cm) fibrillated and ¾ inch (1.9 cm) fibrillated polypropylene, ½ inch (1.25 cm) monofilament and ¾ inch (1.9 cm) monofilament polypropylene and ¾ inch (1.9 cm) monofilament nylon.

As the data depicted in FIGS. 4–7 reveals, marked improvements of flexural behavior, and especially post-peak strength of concrete, resulting from the addition of graded fibers were obtained, clearly showing the efficiency of graded fibers in enhancing the flexural behavior of concrete. The post-peak performance is the measure of the ability of graded fibers to enhance secondary reinforcement properties. This result differs remarkably from prior art where the enhancement of primary properties such as compressive and flexural strength is claimed.

Figure 4:
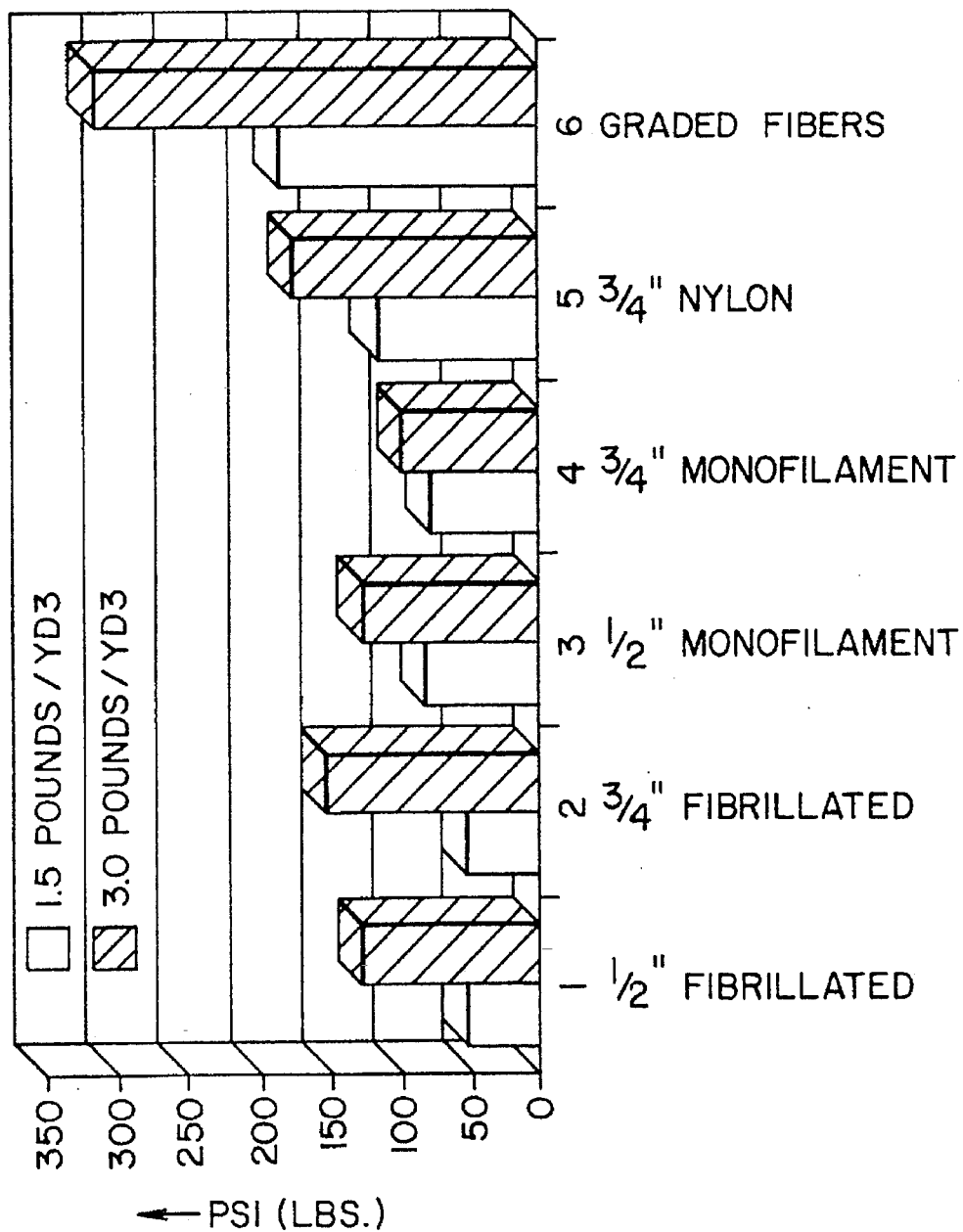
FIG. 4 is a graph depicting post peak flexural strength of concrete specimens reinforced by graded fibers of the present invention versus non-graded fibers of the existing art.
Figure 5:
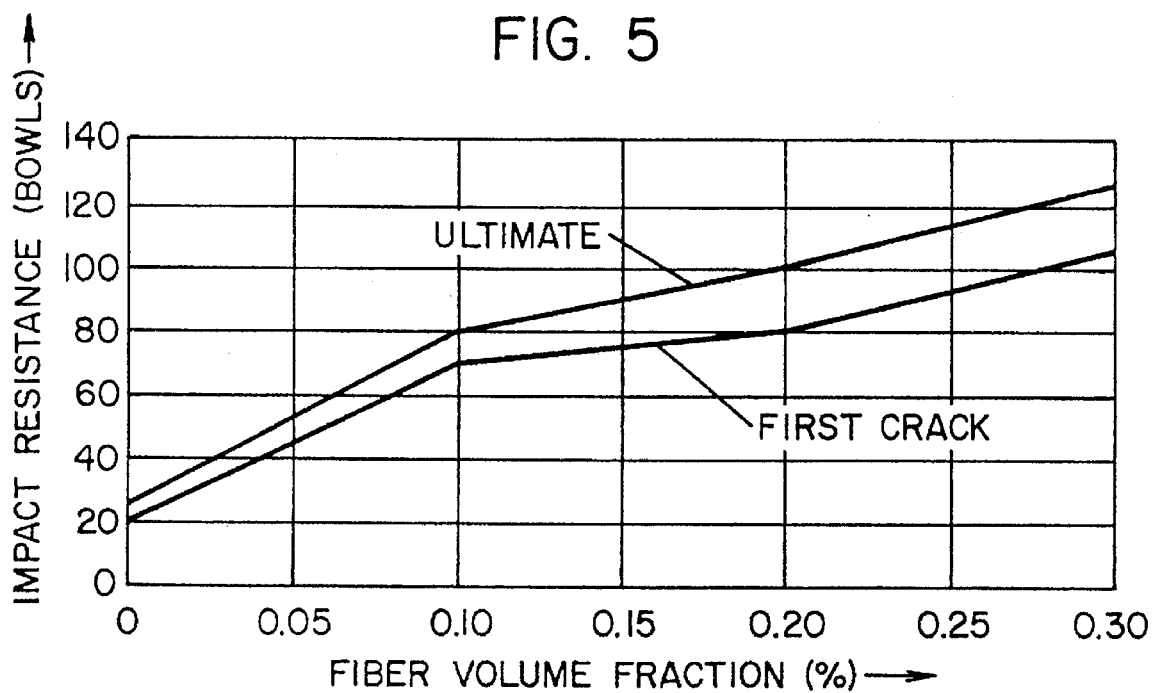
FIG. 5 is a graph depicting the increase in impact resistance for concrete reinforced with graded fibers as the fiber volume is increased.
Figure 6:
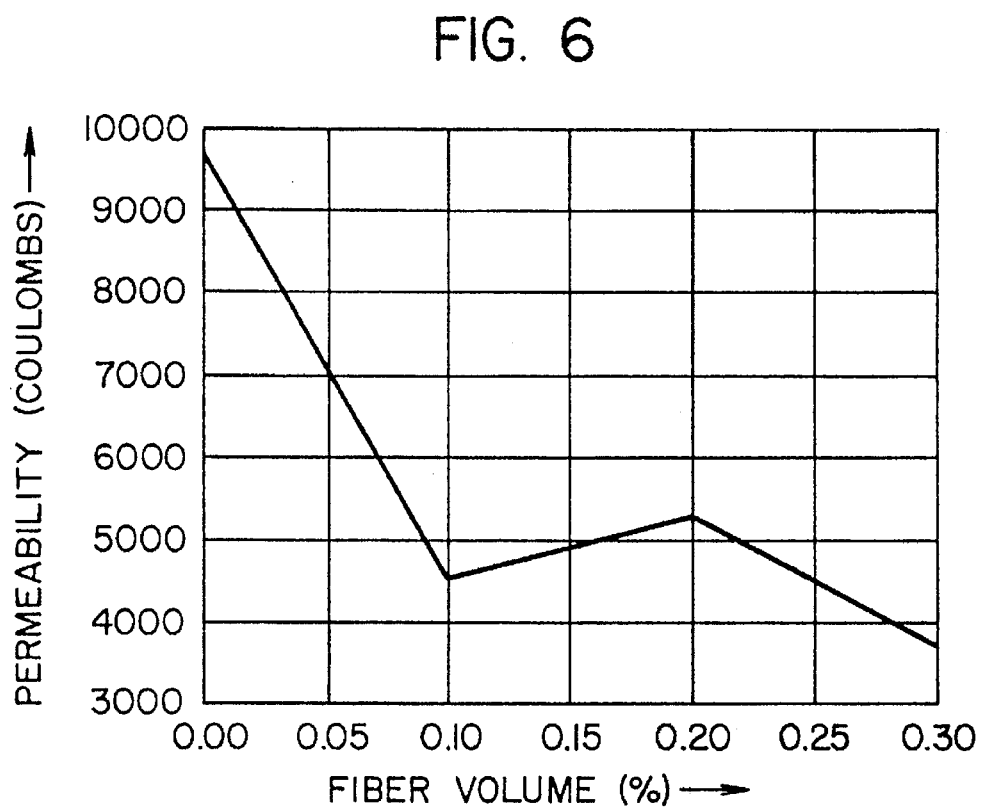
FIG. 6 is a graph depicting the reduction of permeability for concrete reinforced with graded fibers as the fiber volume is increased.
Figure 7:
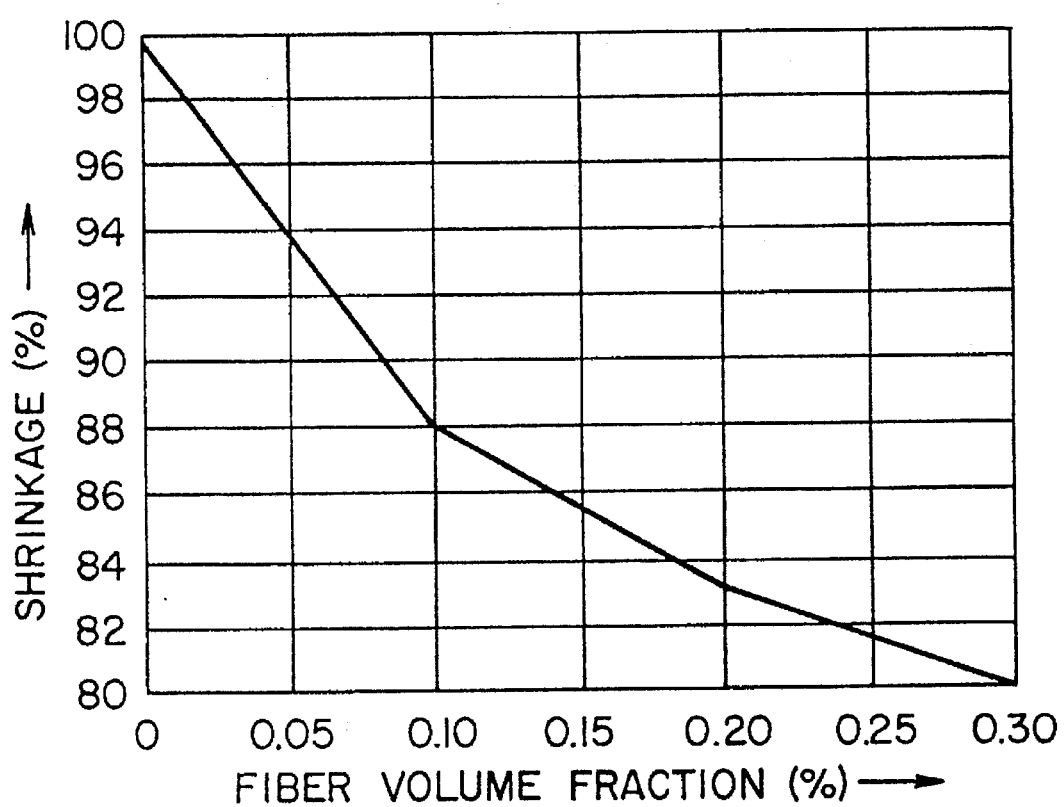
FIG. 7 is a graph depicting the reduction of drying shrinkage for concrete reinforced with graded fibers as the fiber volume is increased.

As is apparent from consideration of the data in FIG. 4, the use of graded fibers in specific amounts, 1.5 and 3 pounds per cubic yard, provided better flexural properties than the use of the uniform length, non-graded fibers. More particularly, FIG. 4 indicates that the graded fibers clearly enabled the test specimen to support greater load after rupture, even when peak flexural strength was not dramatically improved. This load carrying capacity is evidence that graded fibers are evenly distributed throughout all cement paste factions in the concrete, and therefore the fibers maintain a superior ability to support load no matter where the failure may occur.

Other measures of uniform distribution conducted with the same graded fiber-containing samples were impact resistance, permeability and shrinkage. Data from these tests were measured and plotted in FIGS. 5–7, respectively. In each case, the graded fibers provided progressively better impact, lower permeability and lower shrinkage as fiber content increase.

While the mixtures thus far have been described rather specifically, it is to be understood that practice of the present invention is not intended to be limited to the use of 25 different fiber designs, but rather any number of designs can be employed. In similar fashion, while the lengths, widths and thicknesses disclosed herein are preferred for concrete mixtures, it will be appreciated by those skilled in the art that these dimensions can be varied in order to accommodate the concrete or concrete material being reinforced, e.g., precast concrete, cast-in-place concrete, mortar, stucco, grout and the like. Preferably, however, the gradation of fiber designs employed will be selected to fit the half bell-shaped curves discussed hereinabove. Moreover, blends of different fiber types and/or fiber configurations can also be employed.

Although the selection of fiber designs, fiber types, fiber forms and configurations for practice of the present invention can be made by those skilled in the art based upon the foregoing disclosure, several preferences are to be noted. Regarding fiber forms, fibrillated materials can be used alone or in combination with filamentary materials. Fiber configurations need not be varied, but can be, as is also true for fiber types, e.g., polyolefins and polyamides. With respect to fiber designs, which comprise variations in lengths, widths, thicknesses, deniers, fibrillations, cross-sections and/or profiles, it is preferred that at least three different designs be employed. Accordingly, graded fiber mixtures of the present invention contain, prior to their addition to concrete, at least three pluralities of fiber designs encompassing the denier range of about 3 to 5000 and lengths of about 1/16 to 3 inches.

Another graded synthetic fiber mixture comprises three different lengths, widths, deniers or the like from within a given parameter range and then selection of one from the lower portion of the range, one from the upper portion of the range and, one from the middle of the range.

Based upon the foregoing disclosure, it should now be apparent that the present invention carries out the objects set forth hereinabove. It should also be apparent to those skilled in the art that a wide variety of fiber compositions can be employed and while the use of polypropylene fiber is preferred, it is to be understood that the present invention should not be limited thereto, as other fibers can be substituted. Similarly, the selection of fiber designs can be determined from the total disclosure provided herein. Likewise, the use of specific amounts of any particular component, or of the volume of the mixture added to the concrete, does not constitute a limitation on the present invention.

It is, therefore, to be understood that any variations evident fall within the scope of the claimed invention and thus, the selection of specific fibers, designs and amounts can be determined without departing from the spirit of the invention herein disclosed and described. Moreover, the scope of the invention shall include all modifications and variations that may fall within the scope of the attached claims.

What is claimed is:

1. Concrete having improved crack resistance consisting essentially of:

concrete; and from about 0.025 to 1 percent by volume of a graded, synthetic fiber mixture, having deniers ranging from about 3 to about 5000 and lengths ranging from about 0.0625 to 3 inches (0.16 to 7.6 cm), graded to provide pluralities of different fiber designs comprising variations in at least three of lengths, widths, thicknesses, deniers, fibrillations, cross-sections or aspect ratios, prior to their addition to concrete, or at least two of lengths, widths, thicknesses, deniers, fibrillations or aspect ratios, prior to their addition to concrete, or at least two of widths, thicknesses, deniers, fibrillations, cross-sections or aspect ratios, prior to their addition to the concrete, so as to accommodate the mortar factions within said concrete and provide a continuous distribution of fibers therein;

whereby initiation of cracking of the concrete is inhibited as compared to concrete reinforced by the addition of single length fibers.

2. Concrete, as in claim 1, wherein said pluralities of fiber designs are selected from the group consisting of polyolefins; polyesters; polyvinyl chloride; polyvinylidene chloride; polyamides; polyacrylics and mixtures thereof.

3. Concrete, as in claim 2, wherein at least one of said plurality of fibers is made of polypropylene.

4. Concrete, as in claim 1, wherein said synthetic mixture of fiber designs comprises fibrillated materials.

5. Concrete, as in claim 4, wherein said synthetic mixture of fiber designs further comprises filamentary materials.

6. Concrete and like materials, as in claim 1, wherein said synthetic mixture of fiber designs includes at least two pluralities of fibers having different fiber configurations.

7. Concrete and like materials, as in claim 1, wherein said synthetic mixture of fiber designs includes at least two pluralities of fibers having different cross-sectional profiles.

8. A method for improving the crack resistance of concrete comprising the steps of:

adding to a selected amount of concrete, from about 0.025 to 1 percent by volume of a synthetic fiber mixture, having deniers ranging from about 3 to about 5000 and lengths ranging from about 0.0625 to 3 inches (0.16 to 7.6 cm), graded to provide pluralities of different fiber designs comprising variations in at least three of lengths, widths, thicknesses, deniers, fibrillations, cross-sections or aspect ratios, prior to their addition to concrete, or at least two of lengths, widths, thicknesses, deniers, fibrillations or aspect ratios, prior to their addition to concrete, or at least two of widths, thicknesses, deniers, fibrillations, cross-sections or aspect ratios, prior to their addition to the concrete, so as to accommodate the mortar factions within proportioned concrete containing graded aggregate and provide a continuous distribution of fibers therein; and mixing said components sufficiently to distribute said fibers uniformly throughout said concrete, whereby initiation of cracking of the concrete is inhibited as compared to concrete reinforced by the addition of single length fibers.

9. A method, as in claim 8, wherein said pluralities of fiber designs are selected from the group consisting of polyolefins; polyesters; polyvinyl chloride; polyvinylidene chloride; polyamides; polyacrylics and mixtures thereof.

10. A method, as in claim 9, wherein at least one of said plurality of synthetic fibers is made of polypropylene.

11. A method, as in claim 8, wherein said mixture of fibers comprises fibrillated materials.

12. A method, as in claim 11, wherein said mixture of fibers comprises filamentary materials.

13. A method, as in claim 8, wherein said mixture of fibers includes at least two pluralities of fibers having different fiber configurations.

14. A method, as in claim 8, wherein said mixture of fibers includes at least two pluralities of fibers having different cross-sectional profiles.

15. A method for inhibiting the initiation of cracking in concrete during curing stages comprising the steps of:

adding to a selected amount of concrete, from about 0.025 to 1 percent by volume of a synthetic fiber mixture, having deniers ranging from about 3 to about 5000 and lengths ranging from about 0.0625 to 3 inches (0.16 to 7.6 cm), graded to provide pluralities of different fiber designs comprising variations in at least three of lengths, widths, thicknesses, deniers, fibrillations, cross-sections or aspect ratios, prior to their addition to concrete, or at least two of lengths, widths, thicknesses, deniers, fibrillations or aspect ratios, prior to their addition to concrete, or at least two of widths, thicknesses, deniers, fibrillations, cross-sections or aspect ratios, prior to their addition to the concrete, so as to accommodate the mortar factions within proportioned concrete containing graded aggregate; and mixing said components sufficiently to distribute said fibers uniformly throughout said concrete, whereby initiation of cracking of the concrete is inhibited as compared to concrete reinforced by the addition of single length fibers.

16. Concrete having improved crack resistance consisting essentially of:

concrete; and from about 0.025 to 1 percent by volume of a graded, synthetic fiber mixture, said graded fiber mixture containing, prior to its addition to said concrete, at least a first, second, and third plurality of fibers, each of said first, second and third plurality of fibers having deniers ranging from about 15 to about 5000 and lengths ranging from about 0.0625 to 3 inches (0.16 to 7.6 cm);

whereby initiation of cracking of the concrete is inhibited and flexural properties of the concrete are improved as compared to concrete reinforced by the addition of single length fibers.

17. Concrete, as in claim 16, wherein each said plurality of synthetic fibers is selected from the group consisting of polyolefins; polyesters; polyvinyl chloride; polyvinylidene chloride; polyamides; polyacrylics and mixtures thereof.

18. Concrete, as in claim 17, wherein at least one of said plurality of fibers is made of polypropylene.

19. Concrete, as in claim 16, wherein said fiber mixture comprises fibrillated materials.

20. Concrete, as in claim 19, wherein synthetic fiber mixture comprises filamentary materials.

21. Concrete, as in claim 16, further comprising at least three pluralities of fibers having deniers different from each other such that at least one plurality of fibers has a denier at the lower portion of the denier range, at least one plurality has a denier at the upper portion of the range and at least one plurality has a denier in the middle of the range.

22. Concrete, as in claim 21, further comprising at least three pluralities of fibers having lengths different from each other such that one plurality of fibers has a length at the lower portion of the range, one plurality has a length at the upper portion of the range and one plurality has a length in the middle of the range.

23. Concrete, as in claim 16, further comprising at least three pluralities of fibers having lengths different from each other such that one plurality of fibers has a length at the lower portion of the range, one plurality has a length at the upper portion of the range and one plurality has a length in the middle of the range.

24. Concrete, as in claim 16, wherein said synthetic fiber mixture includes at least two pluralities of fibers having different fiber configurations.

25. Concrete, as in claim 16, wherein said synthetic fiber mixture includes at least two pluralities of fibers having different cross-sectional configurations.

26. A method for improving the crack resistance of concrete comprising the steps of:

adding to a selected amount of concrete, a mixture of at least a first, second and third plurality of fibers, each of said first, second and third plurality of fibers having deniers ranging from about 15 to about 5000 and lengths ranging from about 0.0625 to 3 inches (0.16 to 7.6 cm); and mixing said components sufficiently to distribute said fibers uniformly throughout said concrete, said fibers being made of synthetic material, whereby initiation of cracking of the concrete is inhibited and flexural properties of the concrete are improved as compared to concrete reinforced by the addition of single length fibers.

27. A method, as in claim 26, wherein said plurality of synthetic fibers is selected from the group consisting of polyolefins; polyesters; polyvinyl chloride; polyvinylidene chloride; polyamides; polyacrylics and mixtures thereof.

28. A method, as in claim 27, wherein at least one of said pluralities of synthetic fibers are made of polypropylene.

29. A method, as in claim 26, at least three pluralities of fibers having deniers different from each other such that one plurality of fibers has a denier at the lower portion of the range, one plurality has a denier at the upper portion of the range and one plurality has a denier in the middle of the range.

30. A method, as in claim 29, at least three pluralities of fibers having lengths different from each other such that one plurality of fibers has a length at the lower portion of the range, one plurality has a length at the upper portion of the range and one plurality has a length in the middle of the range.

31. A method, as in claim 26, at least three pluralities of fibers having lengths different from each other such that one plurality of fibers has a length at the lower portion of the range, one plurality has a length at the upper portion of the range and one plurality has a length in the middle of the range.

32. A method for inhibiting the initiation of cracking in concrete during curing stages comprising the steps of:

adding to a selected amount of concrete, a mixture of at least a first, second and third plurality of synthetic fibers, each of said first, second, and third plurality of fibers having deniers ranging from about 15 to 5000 and lengths ranging from about 0.0625 to 3 inches (0.16 to 7.6 cm); and mixing said components sufficiently to distribute said fibers uniformly throughout said concrete, said fibers being made of synthetic material.

33. A method, as in claim 32, wherein said plurality of synthetic fibers is selected from the group consisting of polyolefins; polyesters; polyvinyl chloride; polyvinylidene chloride; polyamides; polyacrylics and mixtures thereof.

34. A method, as in claim 33, wherein at least one of said pluralities of synthetic fibers are made of polypropylene.

35. A method, as in claim 32, at least three pluralities of fibers having deniers different from each other such that one plurality of fibers has a denier at the lower portion of the range, one plurality has a denier at the upper portion of the range and one plurality has a denier in the middle of the range.

36. A method, as in claim 35, at least three pluralities of fibers having lengths different from each other such that one plurality of fibers has a length at the lower portion of the range, one plurality has a length at the upper portion of the range and one plurality has a length in the middle of the range.

37. A method, as in claim 32, at least three pluralities of fibers having lengths different from each other such that one plurality of fibers has a length at the lower portion of the range, one plurality has a length at the upper portion of the range and one plurality has a length in the middle of the range.

* * * * *

UNITED STATES PATENT AND TRADEMARK OFFICE
CERTIFICATE OF CORRECTION

PATENT NO. : 5,628,822
DATED : May 13, 1997
INVENTOR(S) : Hogan

It is certified that error appears in the above-identified patent and that said Letters Patent are hereby corrected as shown below:

Column 4, line 21 "15" should read --3--.

Column 4, line 31 "15" should read --3--.

Column 4, line 44 "15" should read --3--.

Claim 16, column 11, line 52, "15" should read --3--.

Claim 26, column 12, line 30, "15" should read --3--.

Claim 32, column 13, line 2, "15" should read --3--.

Signed and Sealed this

Fifth Day of May, 1998

Attest:

BRUCE LEHMAN

Attesting Officer        Commissioner of Patents and Trademarks